(12) United States Patent
Sholingar et al.

(10) Patent No.: US 10,586,448 B2
(45) Date of Patent: Mar. 10, 2020

(54) HAZARD MITIGATION FOR ACCESS TO PASSENGER VEHICLES

(71) Applicant: Ford Global Technologies, LLC, Dearborn, MI (US)

(72) Inventors: Gautham Sholingar, Sunnyvale, CA (US); Jinesh J Jain, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/000,634

(22) Filed: Jun. 5, 2018

(65) Prior Publication Data

US 2019/0371171 A1 Dec. 5, 2019

(51) Int. Cl.
*B60W 50/14* (2012.01)
*G08G 1/0967* (2006.01)
(Continued)

(52) U.S. Cl.
CPC ......... *G08G 1/096725* (2013.01); *B60Q 9/00* (2013.01); *B60W 50/14* (2013.01); *G05D 1/0055* (2013.01); *G05D 1/0231* (2013.01); *G05D 1/0242* (2013.01); *G05D 1/0257* (2013.01); *G05D 1/0278* (2013.01);
(Continued)

(58) Field of Classification Search
CPC ....... G08G 1/096725; G08G 1/096775; B60Q 9/00; B60W 50/14; B60W 2550/143; B60W 2050/143; B60W 2420/40; B60W 2420/52; B60W 2550/12; B60W 2550/147; B60W 2550/406; G05D 1/0055; G05D 1/0231; G05D 1/0242; G05D 1/0257; G05D 1/0275
See application file for complete search history.

(56) References Cited

U.S. PATENT DOCUMENTS 9,823,082 B2 * 11/2017 Lewis ................ G01C 21/3407
10,127,810 B2 * 11/2018 Durie, Jr. ............... G08G 1/205
(Continued)

FOREIGN PATENT DOCUMENTS

DE 102009016563 A1 11/2009
DE 102008063564 A1 6/2010
(Continued)

OTHER PUBLICATIONS

Yang et al., Performance metric alerting: a new design approach for complex alerting problems, 2002, IEEE, p. 123-134 (Year: 2002).*
(Continued)

*Primary Examiner* — McDieunel Marc
(74) *Attorney, Agent, or Firm* — David R. Stevens; Stevens Law Group

(57) ABSTRACT

A method for mitigating hazards to access to passenger vehicles. The method includes detecting, with one or more sensors, a hazardous condition in an area proximate a vehicle. A processor may calculate a safety metric corresponding to the hazardous condition and analyze the safety metric relative to a predetermined threshold. A vehicle occupant may be automatically notified of the hazardous condition in the event the safety metric satisfies the predetermined threshold. A corresponding system is also claimed herein.

20 Claims, 7 Drawing Sheets

(51) Int. Cl.
  *G05D 1/00*   (2006.01)
  *G05D 1/02*   (2020.01)
  *B60Q 9/00*   (2006.01)

(52) U.S. Cl.
  CPC . *G08G 1/096775* (2013.01); *B60W 2050/143* (2013.01); *B60W 2050/146* (2013.01); *B60W 2420/40* (2013.01); *B60W 2420/42* (2013.01); *B60W 2420/52* (2013.01); *B60W 2550/12* (2013.01); *B60W 2550/147* (2013.01); *B60W 2550/406* (2013.01)

(56) References Cited

U.S. PATENT DOCUMENTS

| 10,156,848 | B1* | 12/2018 | Konrardy | B60L 58/12 |
| 10,249,109 | B1* | 4/2019 | Konrardy | G01C 21/3697 |
| 2017/0263120 | A1* | 9/2017 | Durie, Jr. | G08G 1/205 |
| 2017/0305434 | A1* | 10/2017 | Ratnasingam | B60W 40/09 |

FOREIGN PATENT DOCUMENTS

| EP | 3090900 A1 | 11/2016 |
| JP | 2009190560 A | 8/2009 |
| KR | 20170055334 A | 5/2017 |
| WO | WO-2017200532 A1 | 11/2017 |
| WO | WO-2018037780 A1 | 3/2018 |

OTHER PUBLICATIONS

Pont et al. Development of a methodology for monitoring and prediction of road surface conditions in highly automated driving, 2017, IEEE, p. 1-7 (Year: 2017).*

Borges et al., Integrating Off-Board Cameras and Vehicle On-Board Localization for Pedestrian Safety, 2013, IEEE, p. 720-730 (Year: 2013).*

Mukhatar et al., Vehicle Detection Techniques for Collision Avoidance Systems: A Review, 2015, IEEE, p. 2318-2338 (Year: 2015).*

* cited by examiner

| ENVIRONMENTAL CONDITIONS | POINTS |
|---|---|
| Rain | 5 |
| Snow | 10 |
| Sleet | 15 |
| Ice | 15 |
| OBSTACLE PARAMETERS | |
| Obstacle Present | 10 |
| Obstacle in Center of PAZ | 10 |
| Obstacle >20% to Left or Right | 5 |
| Obstacle > Half Width of PAZ | 10 |
| Obstacle ≤ Half Width of PAZ | 5 |
| NATURE OF OBSTACLE | |
| Solid: Dirt, Rocks | 5 |
| Liquid: Spills, Oil Leaks | 10 |
| OTHER FACTORS | |
| Door Swing Constraints | 10 |
| Leaves Obstructing View | 5 |
| Other Factors | X |
| SAFETY RATING | TOTAL |

Fig. 5

HAZARD MITIGATION FOR ACCESS TO PASSENGER VEHICLES

BACKGROUND

Field of the Invention

This invention relates to systems and methods for hazard avoidance.

Background of the Invention

Passenger comfort and safety are primary goals of modern vehicle manufacturers, as consumers demand increasingly high levels of both. The ease of getting into and out of passenger cars is a critical component of customer acceptance and product differentiation. Successful vehicle design thus requires an ergonomically comfortable vehicle having a functional and safe passenger-vehicle interface.

In addition to an acceptable passenger-vehicle interface, safe and comfortable passenger ingress and egress depends on the ground or surface next to the vehicle being adequate to enable the passenger to safely access the vehicle. To this end, some vehicle or OEM manufacturers provide light modules, or "puddle lights," to illuminate the ground next to the vehicle when a passenger door opens. The purpose of such puddle lights is to prevent the driver or passenger from stepping into a puddle or other hazard when entering or exiting the vehicle.

Puddle lights alone, however, are unable to independently mitigate or prevent entry- or egress-type accidents. Indeed, a passenger must still physically inspect the ground to identify a hazardous condition such as mud, water, a spilled drink, rocks, or the like. In the event a passenger identifies such a hazardous condition, the passenger must communicate the issue to the driver in time for the driver to readjust the position of the vehicle before the passenger physically encounters the hazard.

Accordingly, what are needed are systems and methods to automatically identify and mitigate potential hazards to passengers entering or exiting a vehicle. Ideally, such systems and methods would automatically detect various hazards adjacent to the vehicle and inform a passenger of such hazards without requiring physical inspection of the premises. Such systems and methods may also automatically readjust a vehicle position to correct for such hazards and improve the safety and convenience of passengers entering or exiting the vehicle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a table showing a score assigned to various hazards in accordance with one embodiment of the invention;

DETAILED DESCRIPTION

Figure 1:
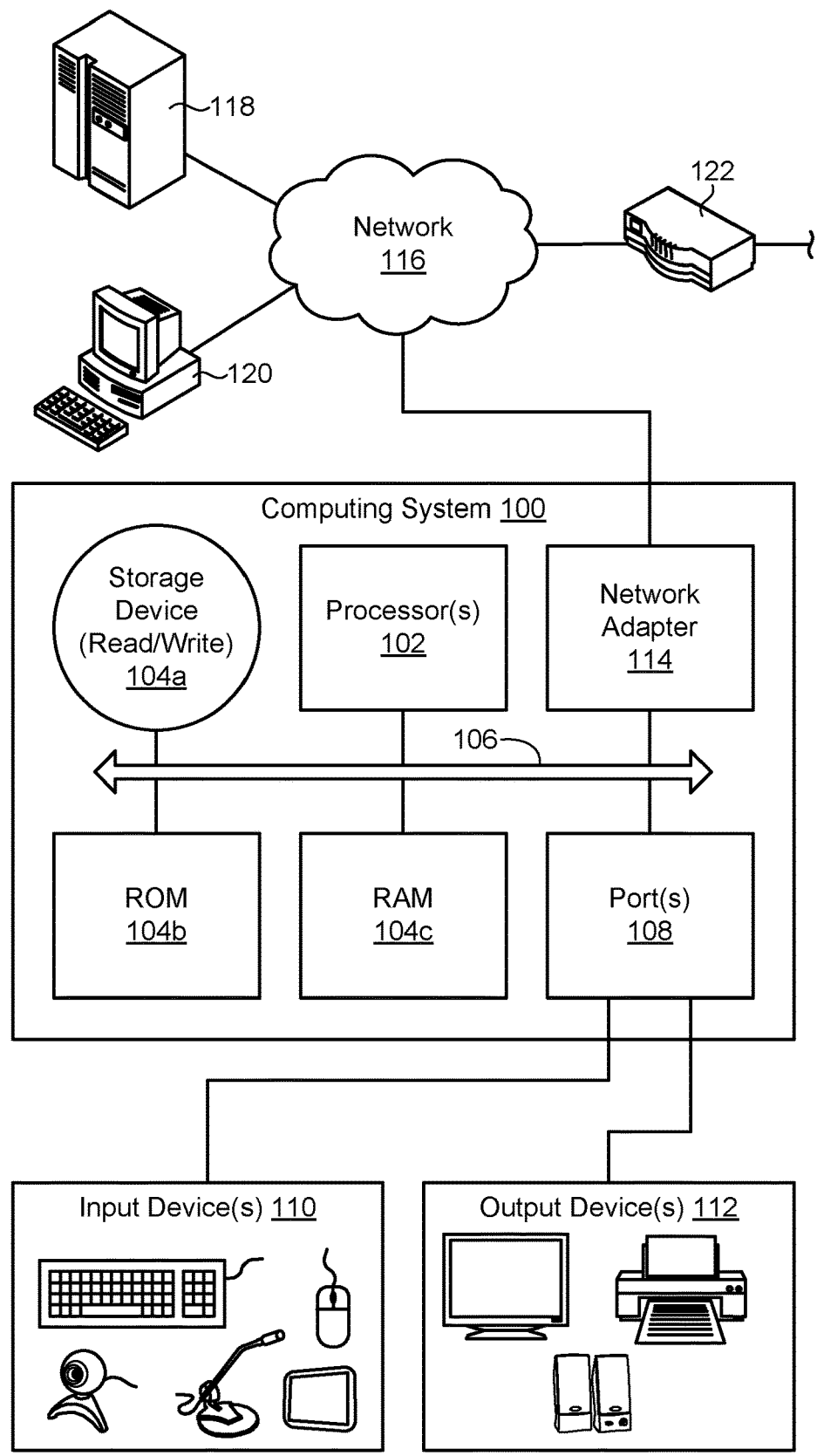
FIG. 1 is a high-level block diagram showing one example of a computing system in which a system and method in accordance with the invention may be implemented.

Referring to FIG. 1, one example of a computing system 100 is illustrated. The computing system 100 is presented to show one example of an environment where a system and method in accordance with the invention may be implemented. The computing system 100 may be embodied as a mobile device 100 such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

As previously mentioned, safe and comfortable vehicle access is very important to overall passenger experience and critically affects overall customer acceptance and product differentiation. While puddle lights have been developed to improve safe vehicle access by illuminating the area adjacent to a vehicle, such lights are inadequate to prevent a passenger from inadvertently encountering a hazardous condition. Indeed, the passenger must still exercise intention in noticing and avoiding the hazard. Systems and methods in accordance with the present invention address these deficiencies by automatically identifying and mitigating potential hazards to passengers entering or exiting a vehicle.

As used herein, the term "vehicle" refers to any autonomous, semi-autonomous, or non-autonomous passenger vehicle, including a car, truck, bus, train, motorcycle, cart, airplane, subway car, or the like.

Figure 2:
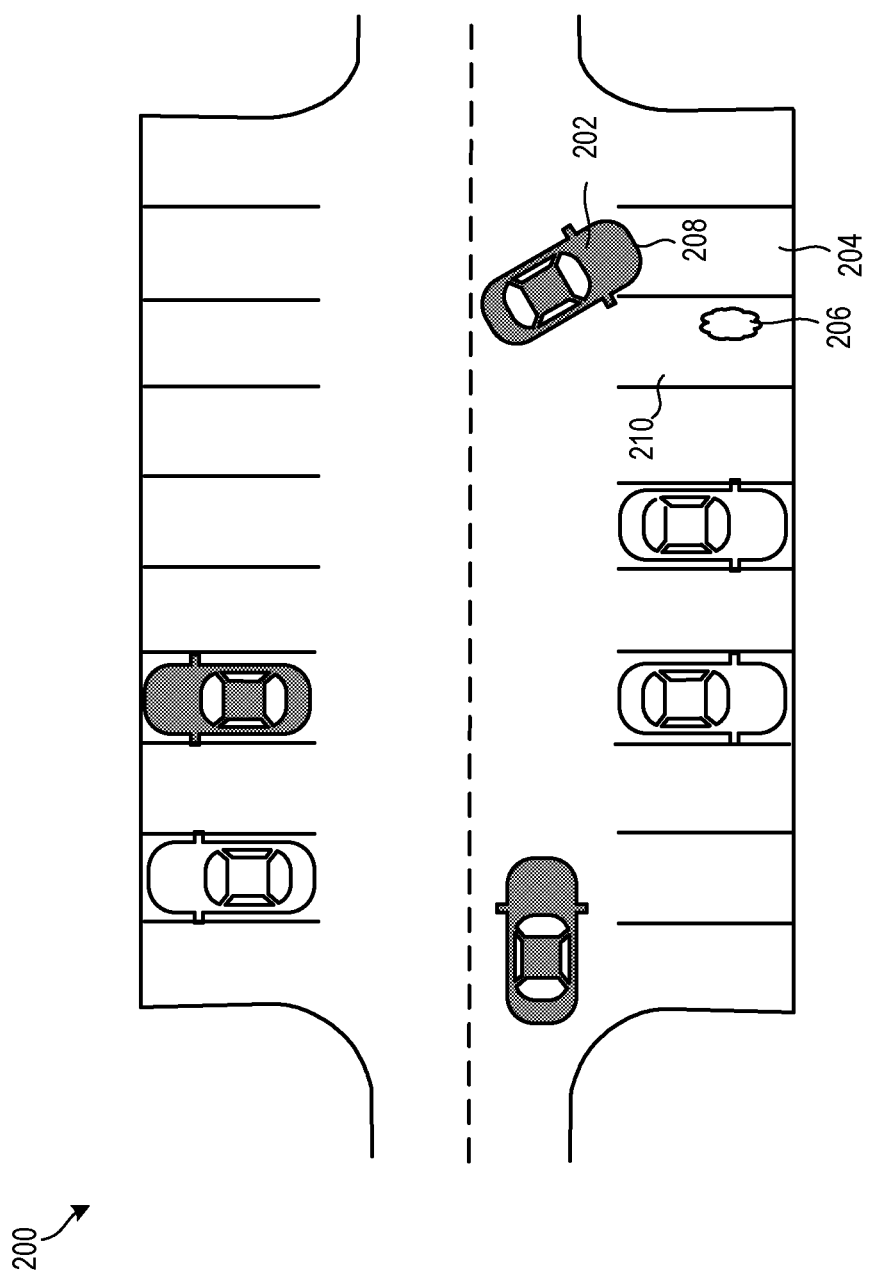
FIG. 2 is a top view of a vehicle approaching a hazard in a parking lot in accordance with certain embodiments of the invention.

Referring now to FIG. 2, some embodiments of an environment 200 for automatically identifying and mitigating hazards to vehicle access may include an autonomous, semi-autonomous, or non-autonomous passenger vehicle 202. The vehicle 202 may include one or more arrays of sensors 208 to sense an external environment. Such sensors 208 may include, for example, camera sensors, lidar sensors, radar sensors, location or GPS sensors, ultrasonic sensors, infrared sensors, and/or the like.

In some embodiments, the sensors 208 may intermittently or continuously scan the external environment to detect the presence of a potential hazard in the immediate vicinity of the vehicle 202. Information gathered from the various sensors 208 may be wirelessly communicated via WiFi, the internet, or other communication method known to those in the art, to a local or remotely-located server or processor associated with the vehicle 202.

In one embodiment, a vehicle 202 having an array of sensors 208 may approach a desired parking spot 204. Certain sensors 208 may be located substantially adjacent a front end of the vehicle 202. As the vehicle 202 approaches the parking spot 204, such sensors 208 may thus detect a spilled substance 206 in an adjacent parking spot 210. This information may be communicated to a server or processor onboard the vehicle 202 for analysis.

In some embodiments, as discussed in more detail below, the server or processor may analyze the identity of the spilled substance 206, as well as its position relative to the parked vehicle 202. In one embodiment, for example, the server or processor may identify the spilled substance 206 as an oil leak. The server or processor may further identify a region of interest associated with the parked vehicle 202. The region of interest may correspond, for example, to an area adjacent to one or more vehicle 202 doors.

Using the identity of the spilled substance 206 and its location within the region of interest as discussed in detail below, the server or processor may perform an algorithm to determine a safety metric for the vehicle 202. If the safety metric exceeds a predetermined value, an actual or intended occupant of the vehicle 202 may be notified of the hazard. Thus, the vehicle occupant may be able to avoid the hazard during entry into or egress from the vehicle 202. In some embodiments, the vehicle occupant may be further instructed to remain in the vehicle 202 as it is repositioned, and the vehicle 202 may be automatically or manually repositioned to a better location.

Figure 3:
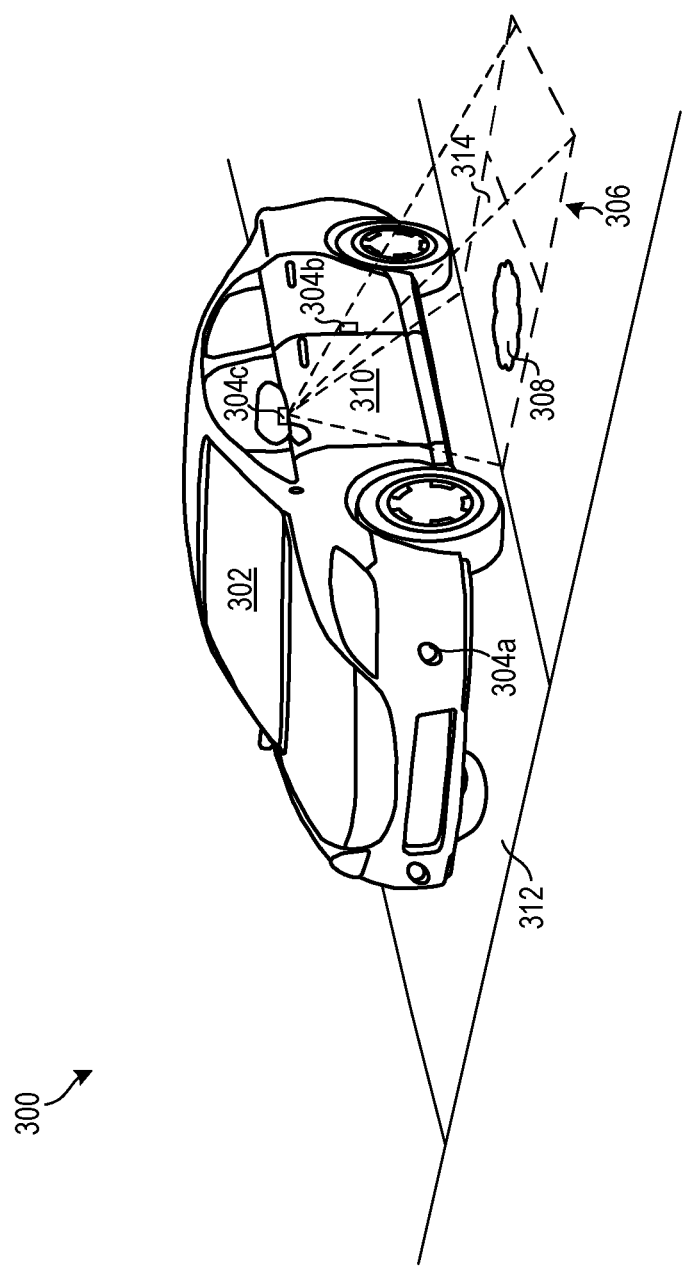
FIG. 3 is a perspective view of a vehicle identifying a hazard in a passenger access zone in accordance with embodiments of the invention.

Referring now to FIG. 3, in some embodiments, an environment 300 for automatically identifying and mitigating hazards to vehicle access may include a vehicle 302 having sensors 304a, 304b, 304c situated in various locations on the vehicle 302. For example, as shown, a vehicle 302 may include a first array 304a of forward-facing sensors, a second array 304b of sensors mounted near a vehicle door 310, and a third array 304a of sensors mounted to side-view mirrors and directed toward an access area, or region of interest 306, immediately adjacent to the vehicle 302. In some embodiments, one or more of the arrays 304a, 304b, 304c of sensors may include camera sensors to gather image data from external environment. Of course, other types of sensors such as lidar sensors, radar sensors, infrared sensors, ultrasonic sensors, and the like, may also be used to collect data from an external environment.

In certain embodiments, the vehicle 302 may utilize GPS or map data to approach a passenger pick-up or drop-off location 312. The various arrays 304a, 304b, 304c of onboard sensors may collect data from the external environment for further processing as the vehicle 302 approaches the location 312. As shown, for example, the second array 304b of sensors mounted near a vehicle door 310 and the third array 304c of camera sensors mounted to side-view mirrors may collect data when the vehicle 302 is directly next to the location 312, while the first array 304a of forward-facing camera sensors may be used to identify obstacles to vehicle 302 access as the vehicle 302 is approaching the location 312. In some embodiments, the vehicle 302 may include sensors located proximate the rear or trunk area of the vehicle 302 to identify obstacles likely to be encountered when accessing objects in the trunk.

In one embodiment, the various arrays 304a, 304b, 304c of onboard sensors may communicate the collected data to a local or remotely-located server or processor. Communication of such information may be triggered by the vehicle 302 reaching a predetermined speed or coming to a stop.

In certain embodiments, the server or processor may detect objects or other potential hazards 308 within a region of interest 306 proximate to the actual or intended vehicle 302 location 312. Potential hazards 308 may include, for example, puddles of water, mud, spilled drinks, groceries, rocks, bushes, steep slopes or uneven surfaces, ice, holes submerged in water, metal grates, or the like. Such objects or potential hazards 308 may be detected by the sensors 304a, 304b, 304c and identified using object or leak detection algorithms, depth maps, and other such techniques known to those in the art. In some embodiments, a passenger entry/egress safety metric may be calculated utilizing the hazard 308 identification data in combination with other data such as hazard 308 location, size, weather conditions, available free space, maximum available door opening angle, and the like.

In some embodiments, for example, the server or processor may define a passenger access zone 314 within the region of interest 306. The passenger access zone 314 may be located immediately adjacent to the vehicle 302 and may define an area where a passenger must step to enter or exit the vehicle 302. As discussed in more detail below, objects or hazards 308 within the passenger access zone 314 may be weighted more heavily than those outside of the passenger access zone 314, as they pose more of a danger to an intended or actual vehicle 302 occupant.

Figure 4:
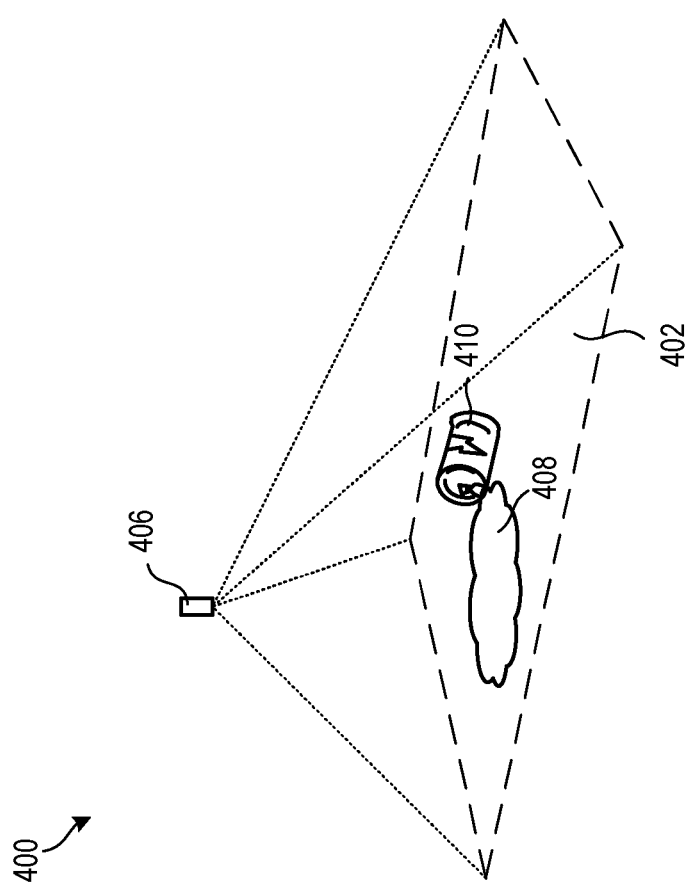
FIG. 4 is a top view of a hazard located in a passenger access zone in accordance with one embodiment of the invention.

Referring now to FIG. 4, in some embodiments, an environment 400 for systems and methods in accordance with the invention may include an array 406 of sensors to detect objects 410 and/or hazards 408 within a passenger access zone 402. As mentioned previously, the array 406 of sensors may be onboard or otherwise associated with a vehicle. In certain embodiments, an array 406 of sensors may be located adjacent to a boarding or loading platform for a mass transit vehicle such as a train, bus, airplane, or subway, or may be situated adjacent to a vehicle parking space in a garage or parking lot.

In any case, one or more sensors 406 or arrays of sensors may be oriented to detect objects 410 and/or hazards 408 within a passenger access zone 402. In some embodiments, arrays of sensors 406 may be oriented to detect objects 410 and/or hazards 408 in a region of interest larger than and including the passenger access zone 402. The location of objects 410 and/or hazards 408 within the passenger access zone 402 and the size of those objects 410 and/or hazards 408 relative to the passenger access zone 402 may determine whether the passenger access zone 402 provides adequate safety and comfort for traversal by an actual or potential vehicle occupant.

In certain embodiments, for example, the array 406 of sensors may detect a soda can 410 and spilled liquid 408 within a passenger access zone 402. An associated server or processor may analyze the sensor data and assign a score to various factors to determine whether the passenger access zone 402 meets a predetermined threshold for safety and comfort.

In one embodiment, a predetermined safety threshold of twenty-five (25) points may be established and used to determine an appropriate response to detected hazards. For example, an autonomous vehicle may park near the curb of a restaurant to permit a vehicle occupant to exit the vehicle. It may be snowing outside, and an obstacle that is larger than half of the passenger access zone may be positioned outside the vehicle door.

A server or processor associated with the autonomous vehicle may utilize data collected from the sensors 406 to detect the presence of snow and to identify the obstacle or hazard as a soda can 410 and spilled liquid 408. The server or processor may also utilize the sensor data to determine that the combined obstacles are larger than half of the width of the passenger access zone 402, and that the obstacle is to the left or right of the center of the passenger access zone 402 by more than 20%.

Each of these factors may correlate to a predetermined score. For example, snow may be +10 points, the presence of an obstacle may be +10 points, an obstacle larger than half the width of the passenger access zone may be +10 points, and an obstacle to the left or right of the center of the passenger access zone by more than 20% may be +5 points. The individual scores may be cumulated for a total score of thirty-five (35) points. Since the total score of 35 points exceeds the predetermined threshold of 25 points, notification may be provided to the vehicle occupant and, in some embodiments, the vehicle may be repositioned to avoid the detected obstacles.

Referring now to FIG. 5, in one embodiment, a table 500 in accordance with the invention may assign a safety metric 514 to each potential hazard or obstacle identified in the region of interest or passenger access zone. The safety metric 514 may be a point value or other score assigned to the hazard. In certain embodiments, the safety metric 514 may be a cumulation of point values 512 assigned to various factors, conditions, and/or parameters present in the region of interest or passenger access zone.

In the embodiment illustrated in FIG. 5, for example, factors, conditions, and/or parameters for hazards detected in the region of interest or passenger access zone may be broken down into categories. Categories of potential hazards may include, for example, environmental conditions 502, obstacle parameters 504, nature of obstacle 506, and other factors 508. A point value 512 may be assigned to each factor, condition, or parameter within each category.

As shown, environmental conditions 502 may include, for example, rain, snow, sleet, and ice, where rain is assigned a point value 512 of five (5), snow is assigned a point value 512 of ten (10), sleet is assigned a point value 512 of fifteen (15), and ice is assigned a point value 512 of fifteen (15).

Under the obstacle parameters 504 category, a point value 512 of ten (10) may be assigned if an obstacle is present, a point value 512 of ten (10) may be assigned if the obstacle is in the center of the passenger access zone, a point value 512 of five (5) may be assigned if the obstacle is to the left of right of the passenger access zone by more than 20%, a point value 512 of ten (10) may be assigned if the obstacle is greater than half the width of the passenger access zone, and a point value 512 of five (5) may be assigned if the obstacle is less than or equal to half the width of the passenger access zone.

For the nature of obstacle 506 category, solid obstacles such as dirt or rocks may be assigned a point value 512 of five (5), while liquid obstacles such as spills or oil leaks may be assigned a point value 512 of ten (10). Under the other factors 508 category, door swing constraints may be assigned a point value 512 of ten (10), and leaves physically obstructing view of the passenger access zone may be given a point value 512 of five (5).

The point values 512 assigned to each factor may be cumulated to provide a safety rating 510 having a corresponding safety metric 514, or total point value 512. This safety metric 514 may be compared to a predetermined threshold to determine an appropriate response.

In certain embodiments, for example, if the safety metric 514 indicates that there are no hazards outside the vehicle, the actual or potential vehicle occupant may be so informed and the vehicle may enable the occupant to enter or exit the vehicle. Otherwise, the vehicle occupant may be notified prior to entering or exiting the vehicle that one or more hazardous conditions are present. Specifically, as discussed in more detail below, if the occupant is inside the vehicle, a system in accordance with the invention may inform the occupant of the hazard using a projection or other heads-up display inside the vehicle, a text message, an audio notification, or other such notification method known to those in the art. If a potential vehicle occupant is outside the vehicle, the occupant may be informed of the hazard using a text message, an augmented reality interface or device, a heads-up display visible on an exterior surface of the car, or other such notification method known to those in the art.

Figure 6:
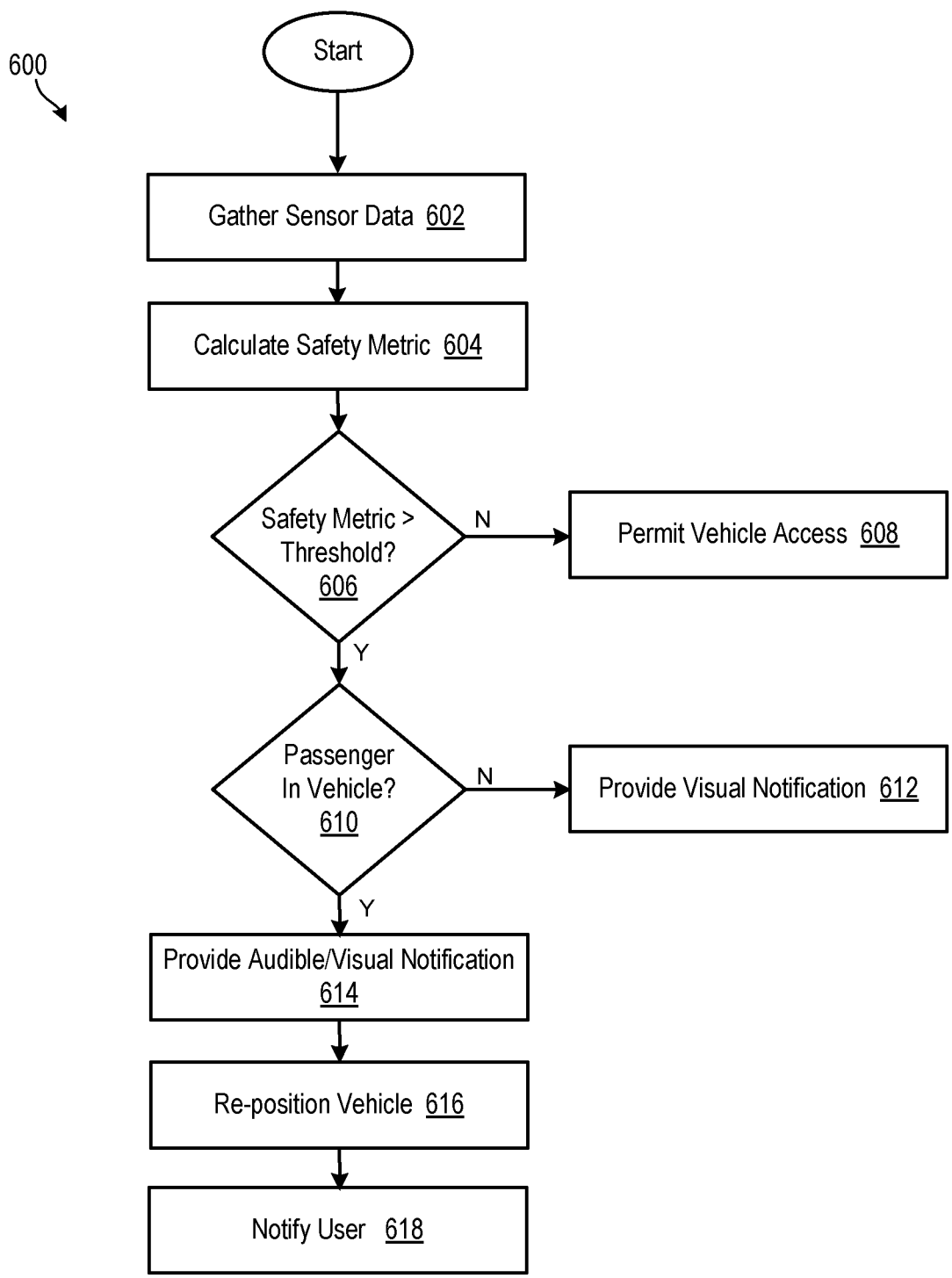
FIG. 6 is a flow chart of a method for hazard mitigation in accordance with certain embodiments of the invention.

Referring now to FIG. 6, a method 600 for automatically identifying and mitigating hazards to vehicle access in accordance with embodiments of the invention may include gathering 602 sensor data from at least one sensor associated with a vehicle. The sensor may include, for example, a camera sensor, a lidar sensor, a radar sensor, a location or GPS sensor, an ultrasound sensor, and/or the like.

The sensor data may be analyzed and processed to calculate 604 a safety metric. In certain embodiments, various aspects of the surrounding environment and hazards and/or obstacles present may be reflected by sensor data and assigned various point values. As set forth above, the safety metric may correspond to a sum total of these point values.

In some embodiments, the safety metric may be compared 606 to a predetermined safety or convenience threshold. If the safety metric is less than the predetermined threshold, the actual or intended vehicle occupant may be permitted 608 to enter or exit the vehicle. In certain embodiments, the occupant may be informed of specific identified hazards prior to entering or exiting the vehicle.

If the safety metric is greater than or equal to the threshold, the method 600 may query 610 whether a passenger is in the vehicle. If no passenger is present in the vehicle, visual notification may be provided 612 to an intended vehicle occupant by way of, for example, augmented reality, a heads-up display on the exterior of the vehicle, a text message to the intended vehicle occupant, or the like. If a passenger or occupant is currently inside the vehicle, an audible and/or visual notification may be provided 614 to the occupant in the form of a text message, a heads-up display, an audible warning, or the like.

The notification may be sent to the vehicle occupant as the vehicle is approaching a stop, or when the vehicle reaches a stop. In one embodiment, a notification may be sent to an occupant prior to the vehicle reaching a stop if the final position may be assumed to be safe for entry or egress based on current sensor data and recent use, for example. Otherwise, notification may be provided upon the vehicle reaching a stop. In this manner, systems and methods 600 in accordance with the invention may collect adequate sensor data to support a real-time determination of whether the final vehicle position is appropriate for safe and comfortable entry or egress.

If the final vehicle position is not deemed adequate, an audible or visual notification may be provided 612, 614 that contains details about the identified hazards and, in some embodiments, informs the occupant that the vehicle may be selectively or automatically re-positioned 616. The notification may contain details about the new pick-up or drop-off location, and may provide a possible time estimate for vehicle repositioning. In one embodiment, for example, the notification may state:

"This is to inform you that there is a spilled drink outside your passenger door. For your convenience, I will move the car to a better location to ensure your safety as you exit the vehicle."

After the vehicle has been repositioned 616 to a new position where the safety metric exceeds the predetermined threshold, an additional notification may be provided 618 to notify the occupant that the vehicle is now safe for entry or exit. In this manner, systems and methods in accordance with the invention may improve user experience, as well as improve passenger safety and comfort in a variety of environments and locations.

Figure 7:
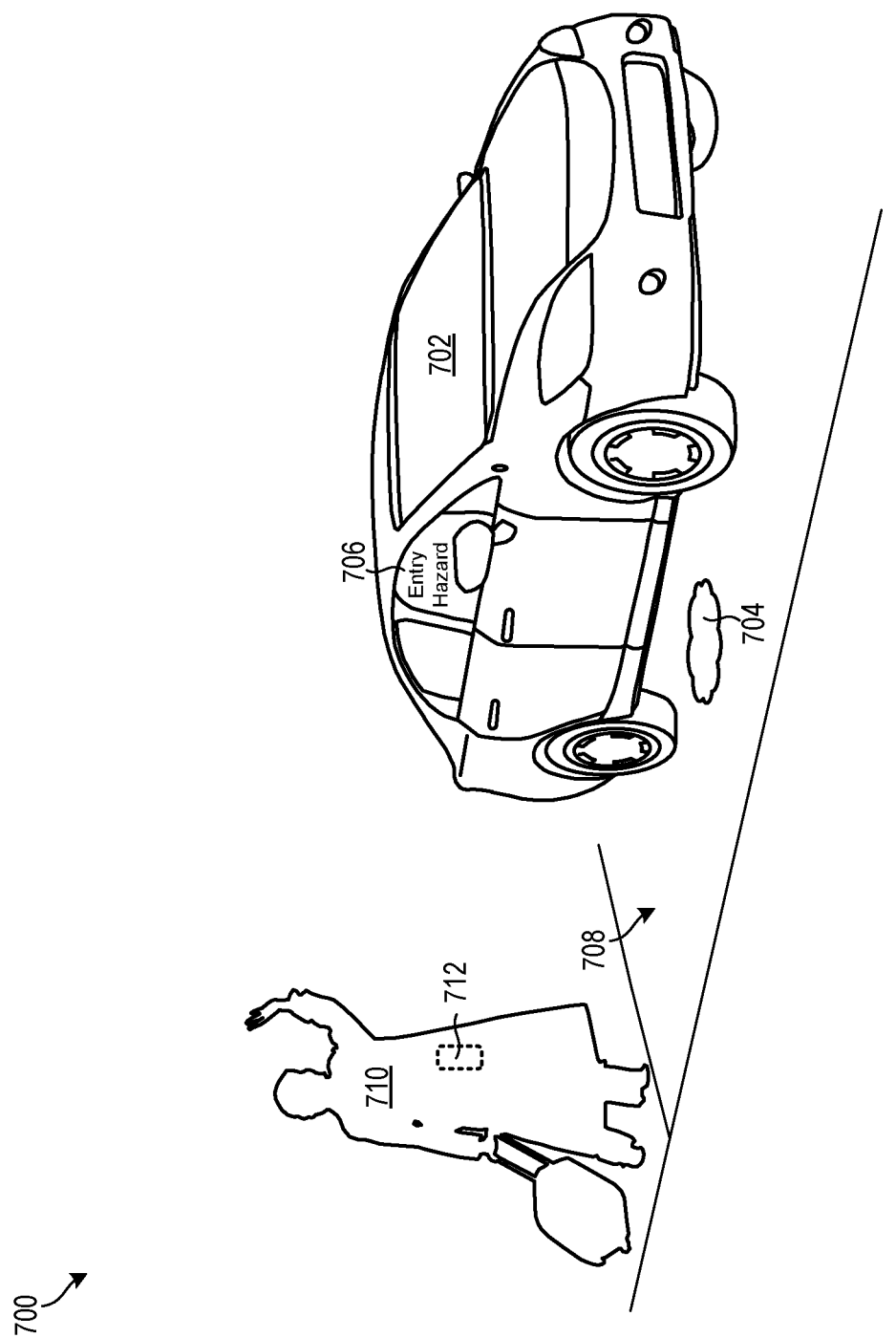
FIG. 7 is a perspective view of a hazard warning displayed on the exterior of a vehicle in accordance with one embodiment of the invention.

Referring now to FIG. 7, some embodiments of systems and methods in accordance with the invention may mitigate hazards encountered by potential vehicle occupants 710 desiring or attempting to enter a vehicle 702. As shown, for example, one environment 700 for a system in accordance with the invention may include a potential vehicle occupant 710 summoning or otherwise requesting a vehicle 702 for pick-up at a particular location 708. The vehicle 702 may utilize map, GPS, or other navigation system and/or sensor data to navigate the vehicle 702 to the identified location 708.

Map, GPS, and other navigation data may be inadequate, however, to enable an autonomous vehicle 702 or a driver of a vehicle 702 to accurately determine whether the identified pick-up location 708 provides adequate safety and convenience for a potential vehicle occupant 710 to safely and comfortably access the vehicle 702. As shown, for example, the vehicle 702 may stop at a position where there is an accumulation of liquid, such as an oil leak 704, in the passenger access zone. An oil leak 704 positioned in this manner relative to the vehicle 702 may require that an occupant entering the vehicle step in the oil leak 704 to access the vehicle 702.

Embodiments of the invention address this problem by gathering data regarding the external environment from sensors associated with the vehicle 702 and processing the data as described above. If the sensor data indicates an oil leak 704 in the passenger access zone as shown, a potential vehicle occupant 710 may be alerted to the hazard by way of a notification 706 visible on an exterior of the vehicle 702 by way of a heads-up display, for example. As depicted by FIG. 7, "Entry Hazard" may be projected or otherwise displayed on a passenger side window to warn the potential vehicle occupant 710 of the oil leak 704 prior to entering the vehicle 702. In other embodiments, the potential vehicle occupant 710 may be notified of the hazard by way of a text message sent to the potential vehicle occupant's 710 cellular phone 712, for example, or by any other means known to those in the art.

In certain embodiments, the potential vehicle occupant 710 may respond to the notification 706 by selectively instructing the vehicle 702 to move to a more easily accessible location. In other embodiments, the vehicle 702 may automatically reposition itself to facilitate easier access for the potential vehicle occupant 710.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method, comprising:
    detecting, via at least one sensor, a hazardous condition in a pedestrian travel path external to and proximate a stationary vehicle;
    calculating, via a processor, a safety metric corresponding to the hazardous condition;
    analyzing, via the processor, the safety metric relative to a predetermined threshold; and
    automatically notifying a vehicle occupant of the hazardous condition in the event the safety metric satisfies the predetermined threshold.

2. The method of claim 1, further comprising sensing, via the at least one sensor, an external environment of the vehicle.

3. The method of claim 2, wherein the at least one sensor is selected from the group consisting of a lidar sensor, a radar sensor, a camera sensor, an infrared sensor, an ultrasonic sensor, and a global navigation satellite system sensor.

4. The method of claim 1, wherein the area comprises a region substantially adjacent to at least one of a door and a trunk of the vehicle.

5. The method of claim 1, further comprising identifying, via the processor, the hazardous condition.

6. The method of claim 5, wherein the hazardous condition comprises at least one of rain, sleet, snow, ice, rocks, dirt, leaves, a spill, an oil leak, an uneven surface, a blocked surface, and an obstacle.

7. The method of claim 1, wherein calculating the safety metric comprises assigning a score to the hazardous condition and cumulating the score for more than one hazardous condition.

8. The method of claim 7, further comprising adjusting the score in response to a position of the hazardous condition relative to a door of the vehicle.

9. The method of claim 1, wherein automatically notifying the vehicle occupant comprises utilizing at least one of a heads-up display, a text message, an audible notification, and an email message.

10. The method of claim 1, further comprising automatically repositioning the vehicle to avoid the hazardous condition.

11. The method of claim 1, wherein the vehicle is an autonomous vehicle.

12. A system comprising:
- at least one processor; and
- at least one memory device coupled to the at least one processor and storing instructions for execution on the at least one processor, the instructions causing the at least one processor to:
  - detect, via at least one sensor, a hazardous condition in a pedestrian travel path external to and proximate a stationary vehicle;
  - calculate a safety metric corresponding to the hazardous condition;
  - analyze the safety metric relative to a predetermined threshold; and
  - notify a vehicle occupant of the hazardous condition in the event the safety metric satisfies the predetermined threshold.

13. The system of claim 12, wherein the instructions further cause the at least one processor to sense, via the at least one sensor, an external environment of the vehicle.

14. The system of claim 12, wherein the area comprises a region substantially adjacent to at least one of a door and a trunk of the vehicle.

15. The system of claim 12, wherein the instructions further cause the at least one processor to identify the hazardous condition.

16. The system of claim 12, wherein calculating the safety metric comprises assigning a score to the hazardous condition and cumulating the score for more than one hazardous condition.

17. The system of claim 16, further comprising adjusting the score in response to a position of the hazardous condition relative to a door of the vehicle.

18. The system of claim 12, wherein automatically notifying the vehicle occupant comprises at least one of a heads-up display, a text message, an audible notification, and an email message.

19. The system of claim 12, wherein the instructions further cause the at least one processor to automatically reposition the vehicle to avoid the hazardous condition.

20. The system of claim 12, wherein the vehicle is an autonomous vehicle.

* * * * *